United States Patent [19]
Palmer

[11] Patent Number: 5,842,502
[45] Date of Patent: Dec. 1, 1998

[54] SYSTEM FOR CONTROLLING FLOW THROUGH A PROCESS REGION

[76] Inventor: David W. Palmer, 200 Ames Pond Dr., North Andover, Mass. 01845

[21] Appl. No.: 800,401

[22] Filed: Feb. 14, 1997

Related U.S. Application Data

[62] Division of Ser. No. 475,013, Jun. 7, 1995, which is a division of Ser. No. 141,498, Oct. 22, 1993, Pat. No. 5,450,873, which is a continuation-in-part of Ser. No. 965,909, Oct. 23, 1992, abandoned, Ser. No. 965,907, Oct. 23, 1992, Pat. No. 5,320,124, and Ser. No. 126,151, Sep. 23, 1993, Pat. No. 5,456,280.

[51] Int. Cl.$^6$ ...................................................... G05D 7/06
[52] U.S. Cl. .......................................... 137/500; 137/337
[58] Field of Search ........................ 137/500, 543.15; 251/337

[56] References Cited

U.S. PATENT DOCUMENTS

| | | | |
|---|---|---|---|
| 292,396 | 1/1884 | Ahren | 137/543.15 |
| 1,235,409 | 7/1917 | Aldrich | 137/240 |
| 1,789,209 | 1/1931 | Asbury | 251/337 |
| 1,927,972 | 9/1933 | Young | 137/153 |
| 1,994,336 | 3/1935 | Dawson | 137/240 |
| 2,105,876 | 1/1938 | Birch | 251/52 |
| 2,367,989 | 1/1945 | Alders | 251/146 |
| 2,737,966 | 3/1956 | Lucien | 251/52 |
| 2,842,159 | 7/1958 | Sprague | 137/513.7 |
| 2,868,225 | 1/1959 | Wigham et al. | 137/503 |
| 2,899,973 | 8/1959 | Carlson | 137/505.41 |
| 3,138,174 | 6/1964 | Gilpin | 137/503 |
| 3,194,254 | 7/1965 | Zmek | 137/505.12 |
| 3,237,616 | 3/1966 | Daigh | 137/283 |
| 3,312,241 | 4/1967 | Bryant | 137/599 |
| 3,336,942 | 8/1967 | Keith et al. | 251/337 X |
| 3,605,788 | 9/1971 | Brown | 137/220 |
| 3,703,913 | 11/1972 | Carsten | 137/599 |
| 3,741,476 | 6/1973 | Travaglio | 236/87 |
| 3,742,972 | 7/1973 | Hughes | 137/110 |
| 3,766,933 | 10/1973 | Nicholson, Jr. | 137/116.3 |
| 3,806,027 | 4/1974 | Ginn et al. | 236/49 |
| 3,820,556 | 6/1974 | Millar et al. | 137/220 |
| 3,853,143 | 12/1974 | DeLepeliere | 137/494 |

(List continued on next page.)

FOREIGN PATENT DOCUMENTS

| | | |
|---|---|---|
| 275361 | 7/1988 | European Pat. Off. |
| 957118 | 5/1964 | United Kingdom . |
| 1429932 | 3/1976 | United Kingdom . |
| 2236165 | 3/1991 | United Kingdom . |

OTHER PUBLICATIONS

Amminger, W. L., "Computational Valve Analysis," Proceedings of the Second National Fluid Power System and Controls Conference (University of Wisconsin, May 21–23, 1975).

Primary Examiner—Stephen M. Hepperle
Attorney, Agent, or Firm—Bromberg & Sunstein LLP

[57] ABSTRACT

A regulator for maintaining a constant partial vacuum in a region, such as in a piece of process equipment or a fume hood. The regulator includes a path, through which fluid passes from the region to the vacuum source, and a movably mounted piston having a frontal face, which is exposed to fluid in the path, and a distal face, which is exposed to a reference pressure, such as the pressure of the environment in which the equipment is located. The piston is disposed in the path so that the piston may constrict the path at a constriction point. Fluid in the path upstream of the constriction point exerts a pressure on the frontal face of the piston that tends widen the path at the constriction point. The piston is mounted so that the weight of the piston exerts a force on the piston in a direction that tends to widen the path at the constriction point. A force is exerted on the piston, preferably by a spring under compression, in a direction that tends to narrow the path at the constriction point. A buffering gas, introduced to the area between the piston's skirt and the piston mounting structure, may be used to keep noxious fumes from backing up into the environment and/or to provide an efficient bearing.

19 Claims, 7 Drawing Sheets

U.S. PATENT DOCUMENTS

| | | | |
|---|---|---|---|
| 3,862,644 | 1/1975 | Emmons et al. | 137/486 |
| 3,900,045 | 8/1975 | Murrell | 137/505.38 |
| 3,937,249 | 2/1976 | Suey | 251/337 |
| 3,995,656 | 12/1976 | Mills, Jr. | 137/497 |
| 4,039,124 | 8/1977 | Ginn et al. | 236/1 B |
| 4,092,998 | 6/1978 | Taplin | 137/471 |
| 4,250,914 | 2/1981 | Ferrentino | 137/501 |
| 4,250,915 | 2/1981 | Rikuta | 137/501 |
| 4,431,020 | 2/1984 | Kowalski | 137/110 |
| 4,508,140 | 4/1985 | Harrison | 137/501 |
| 4,732,190 | 3/1988 | Polselli | 137/460 |
| 4,739,924 | 4/1988 | Kelley | 236/49 |
| 4,768,543 | 9/1988 | Weinke et al. | 137/240 |
| 4,791,956 | 12/1988 | Kominami et al. | 137/503 |
| 4,791,957 | 12/1988 | Ross | 137/505.12 |
| 4,796,660 | 1/1989 | Bron | 137/504 |
| 4,827,975 | 5/1989 | Steiger | 251/337 X |
| 4,893,551 | 1/1990 | Sharp et al. | 98/115.3 |
| 4,979,527 | 12/1990 | Mueller et al. | 137/15 |
| 5,000,221 | 3/1991 | Palmer | 137/505 |
| 5,360,197 | 11/1994 | Reiter et al. | 251/337 X |

SYSTEM FOR CONTROLLING FLOW THROUGH A PROCESS REGION

RELATED U.S. APPLICATIONS

This application is divisional of application Ser. No. 08/475,013, filed Jun. 7, 1995, which is a divisional of application Ser. No. 08/141,498, filed Oct. 22, 1993, now issued as U.S. Pat. No. 5,450,873 , which is a continuation-in-part of applications Ser. No. 07/965,909, filed Oct. 23, 1992, now abandoned, Ser. No. 07/965,907, filed Oct. 23, 1992, now issued as U.S. Pat. No. 5,320,124, and 08/126,151, filed Sep. 23, 1993, now issued as U.S. Pat. No. 5,456,280. All these applications are hereby incorporated herein by reference.

TECHNICAL FIELD

This invention generally relates to a device for regulating the flow of a fluid, particularly a gas, through the device.

BACKGROUND ART

In heating, ventilating, and air conditioning (HVAC) systems and house exhaust systems, air flow is typically controlled using resistors to slow down the flow of air to and from different points in a building. When one resistor is adjusted, the pressure level throughout the system will change; any change in the system pressure will affect the flow of air past every other resistor. Thus, adjusting a resistor at one point causes "cross-talk" with resistors at other points.

One of the most complex problems confronted by the HVAC industry is controlling air flow through process rooms, such as the clean rooms used in semiconductor integrated-circuit chip manufacturing, or the medical and biotechnology laboratories kept at below atmospheric pressure to prevent potentially dangerous microbes from blowing out of the laboratories. Some air exits the process room through process equipment and other work stations with fume hoods. A partial vacuum is usually required in such equipment in order to ensure that noxious fumes or dangerous microbes do not leak from the process equipment or fume hoods and thereby endanger personnel working nearby. It is frequently important that a constant partial vacuum be maintained in the process equipment in order to minimize defects in the integrated circuit chips being manufactured. In some process equipment it is important that only a small partial vacuum be maintained.

SUMMARY OF THE INVENTION

The present invention regulates a partial vacuum in a region, such as in a piece of process equipment or a fume hood. The partial vacuum may be with respect to the environment in which the equipment is located, so that the region's pressure is between the pressure of the environment and the pressure of the vacuum source to which the regulator is attached. One embodiment of the invention is particularly well suited for maintaining at a fairly constant level a small partial vacuum in the region with respect to the environment—i.e., a small pressure differential between the region and the environment.

The invention includes a path, through which fluid passes from the region to the vacuum source, and a movably mounted piston having a frontal face, which is exposed to fluid in the path, and a distal face, which is exposed to a reference pressure, preferably the environment's pressure. Preferably, the areas of the frontal and distal faces are about the same.

The piston is disposed in the path so that the piston may constrict the path at a constriction point, which is preferably located between the rim of the piston and the rigid wall of the fluid path. Fluid in the path upstream of the constriction point (the region side of the constriction point) exerts a pressure on the frontal face of the piston. The reference pressure is exerted on the distal face of the piston. Fluid in the path downstream of the constriction point (the vacuum-source side of the constriction point) exerts a pressure on the piston in a direction transverse to the piston's direction of movement, so that pressure changes downstream of the constriction point have a minimal effect on the regulated partial vacuum. In one preferred embodiment, the piston is disposed in the path so that the fluid flows radially outward from the frontal face's central portion towards the piston's rim before flowing through the constriction point.

In an embodiment for creating a small partial vacuum, The piston is mounted so that the weight of the piston exerts a force on the piston in a direction that tends to widen the path at the constriction point, and a force is exerted on the piston, preferably by a spring under compression, in a direction that tends to narrow the path at the constriction point.

The spring's base may be made movable with respect to the portion of the path at the constriction point in order to adjust the partial vacuum or to compensate for a varying flow rate. The spring's base may be moved so as to decrease or increase the apparent weight of the piston. As noted above, to decrease the apparent weight of the piston, a force is exerted on the piston in a direction that tends to narrow the path at the constriction point. In order to increase the apparent weight of the piston, a force is exerted on the piston in a direction that tends to widen the path at the constriction point.

In one preferred embodiment, the invention includes a piston movably mounted adjacent the passageway. The piston may constrict the flow at a constriction point between the rim of the piston and a wall of the passageway. As the piston moves, the resistance the piston applies to the flow through the passageway varies. The piston is mounted on or in a piston-mounting structure, such that the piston and the piston-mounting structure define a reference-pressure chamber. A buffering fluid is supplied to a point between the piston and the piston-mounting structure, such that one portion of the buffering fluid flows into the passageway and another portion into the reference-pressure chamber. The piston may include a skirt which surrounds a portion of the piston-mounting structure, and the point to which the buffering fluid is supplied is between the piston-mounting structure and the piston's skirt. (In the preferred embodiment, the skirt is located outside of the piston-mounting structure; however, in an alternative embodiment the piston-mounting structure may be located outside of the skirt.) The first portion of the buffering fluid flows into the passageway downstream of the constriction point.

The piston-mounting structure may be tilted from a vertical orientation, so that the force exerted by the weight of the piston in the direction that the piston can move is less than the weight of the piston. This embodiment is well suited for maintaining at a fairly constant level a small partial vacuum in the region with respect to the environment—i.e., a small pressure differential between the region and the environment.

A biasing fluid may be introduced into the passageway upstream of the constriction point, so as to ensure that there is always a substantial flow rate through the device. A dashpot may be used in order to reduce any harmonic vibrations of the piston.

In an alternative embodiment, the piston may be hingedly mounted so as to rotate around a hinge point, so that the weight of the piston creates a first torque urging the piston to turn around the hinge point, and means for creating a second torque in the opposite direction of the first torque is provided. The means for creating the second torque may be a spring, a counterweight, a stalled DC electric motor or some other means.

The system for controlling the flow through the process region may include a pressure transducer, which is protected from potentially damaging fumes by a buffering-gas flowing through a passageway connecting the transducer to the region. The system may also use a condensation trap using peltier elements, in order to remove some of the fumes before they enter the regulator and the house exhaust system.

DESCRIPTION OF SPECIFIC EMBODIMENTS

Figure 1:
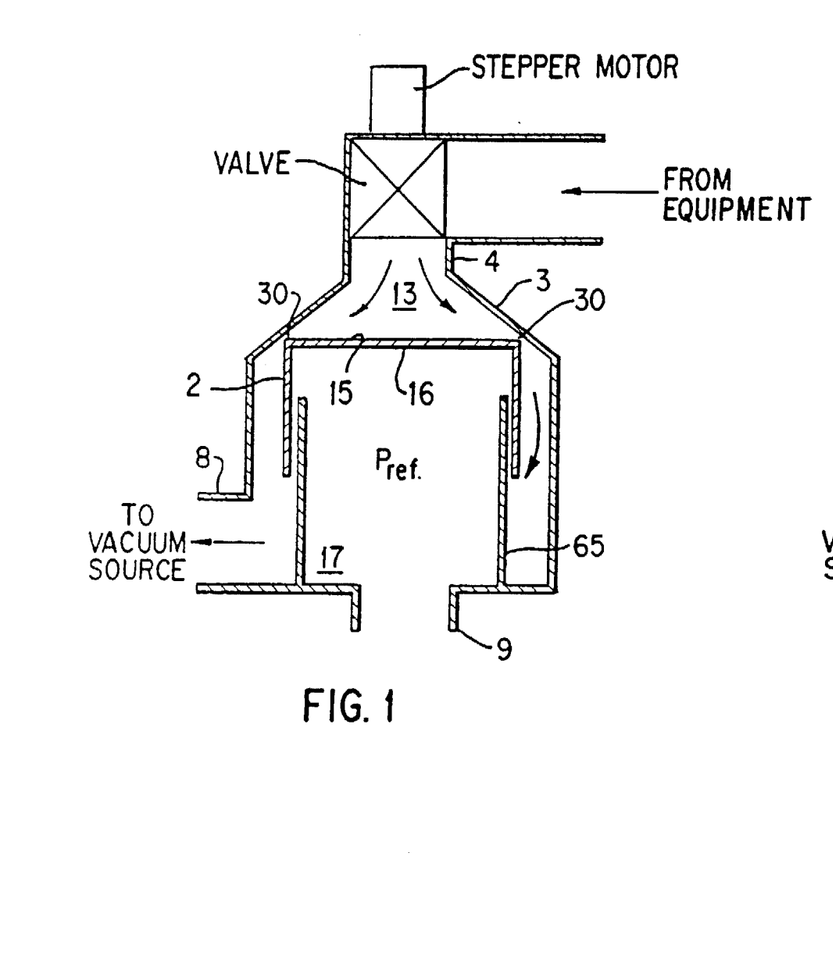
FIG. 1 shows a cross-section of a device that may be used to maintain in a piece of process equipment a partial vacuum.

FIG. 1 shows a regulator as described in U.S. Pat. No. 5,000,221, issued to the inventor of the present invention. The regulator is attached to a piece of process equipment, a fume hood or other region which is located in a process room or other environment. Air flows from the environment into the equipment, where noxious gases, microbes or other potentially dangerous contaminants may be picked up by the air. Typically, there is some varying impedance on the flow from the environment into the equipment. For instance, the equipment may have a door, which is opened to permit the loading of some item which is to be treated by the equipment. When the door is opened, the impedance to the flow from the environment into the equipment is lessened. After passing through the equipment, the air is then pulled into the regulator's inlet 4, through the regulator, and then out of its outlet 8 to the vacuum source.

This regulator includes a piston 2 having a frontal face 15 and a distal face 16, which have approximately the same areas. The piston 2 is mounted on a mounting structure 65, so that it can move up to constrict the flow through the regulator at a constriction point 30 between the rim of the piston 2 and the housing 3 (which functions as a valve seat), and so that the piston 2 can move down to widen the path at the constriction point 30. The piston's frontal face 15 is exposed to plenum 13, through which the air flows just before passing through the constriction point 30. The piston's distal face 16 is exposed to a reference chamber 17, which is preferably attached by means of reference port 9 to the environment, so that the fluid pressure on the piston's distal face 16, the reference pressure ($P_{REF}$), is equal to the environment's pressure.

Since the fluid pressure just downstream of the constriction point 30 applies a force on the skirt of the piston 2 that is, for the most part, perpendicular to the directions in which the piston 2 can move, the regulator can maintain a fairly constant pressure differential between the plenum 13 and the reference-pressure chamber 17, the pressure in the plenum 13 being less than the reference pressure. This pressure differential is related to the weight of the piston 2 and the surface areas of the frontal face 15 and distal face 16:

$P_{REF} \cdot A = P_{13} \cdot A + W$, where A=Area of frontal face, which is substantially equal to the area of distal face;
$P_{13}$=Plenum pressure; and
W=Weight of piston 2.

Thus, $\Delta P = W/A$, where $\Delta P$=Pressure differential between plenum 13 and reference-pressure chamber 17.

The constant pressure differential can be used to maintain in the equipment to which the regulator is attached a constant partial vacuum with respect to the environment. Such a constant partial vacuum can be maintained by simply attaching the reference port 9 to the environment, and attaching the regulator's input 4 to the equipment so that there is only a small pressure drop from the equipment to the plenum 13. With such an arrangement, the flow rate through the regulator varies in order to maintain the constant vacuum.

To maintain a smaller constant partial vacuum, a lighter and wider piston 2 may be used. (Conversely, a heavier piston 2 may be used to create a larger constant partial vacuum.) However, there are practical limits on how light the piston material can be. Another way of decreasing the partial vacuum in the equipment is by placing a valve upstream of the regulator (and downstream of the equipment), as shown in FIG. 1, to create a pressure drop from the equipment to the plenum 13. This valve may be adjusted by a stepper motor to alter the partial vacuum. This arrangement is however somewhat less effective for maintaining a constant partial vacuum and is better suited for maintaining a substantially constant flow rate.

Figure 2:
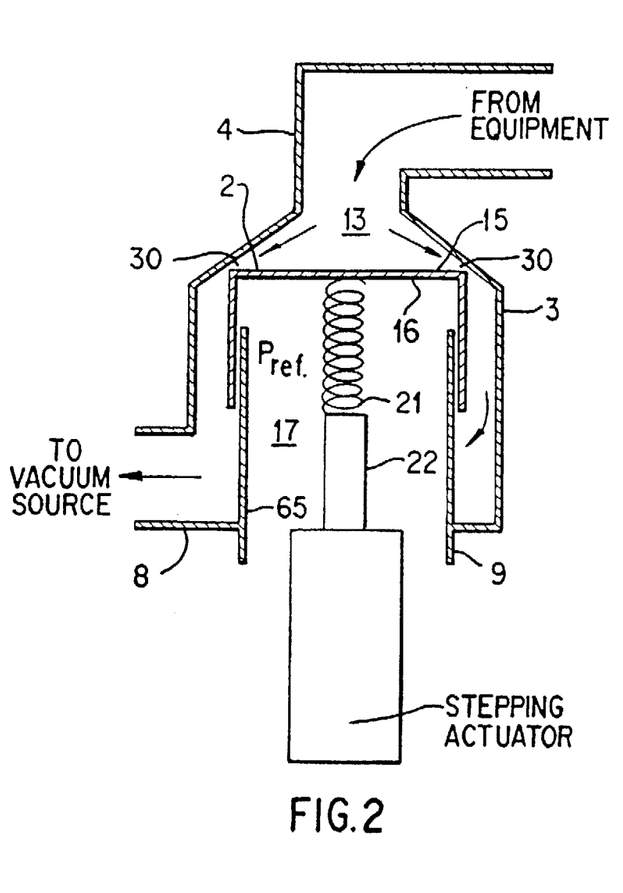
FIG. 2 shows a cross-section of a device that may be used to maintain in a piece of process equipment a small partial vacuum.

The device shown in FIG. 2 maintains a small, substantially constant partial vacuum very well. Like the device shown in FIG. 1, the FIG. 2 device has a piston 2, movably mounted so that it may constrict the flow path between the rim of the piston 2 and the housing 3 at a constriction point 30. Air in the path downstream of the constriction point 30 exerts a pressure on the piston 2 in a direction perpendicular to the piston's direction of movement. The force of the reference pressure on the distal face 16, which is offset by the force exerted by air in the plenum 13 on the piston's frontal face 15, tends to narrow the flow path at the constriction point 30. The areas of the frontal face 15 and the distal face 16 are substantially the same, although it may be preferable in some embodiments to make the frontal face's area slightly smaller than the distal faces, as discussed below. (It is preferred that the frontal and distal faces be flat and perpendicular to the piston's direction of movement. If, however, the frontal and distal faces are not flat planes perpendicular to the direction of movement of the piston 2, the effective areas of the faces—i.e., the projection of the faces on a plane perpendicular to the direction of movement of the piston 2—should be equal.)

The piston 2 is mounted so that its weight exerts a force on the piston in a direction that tends to widen the path at the constriction point 30. Since weight of the piston 2 tends to widen the constriction point 30, and tends to restore the regulator to its most open position when there is no flow, the weight of the piston 2 is considered a restoring force.

Unlike the device shown in FIG. 1, the regulator shown in FIG. 2 does not have an adjustable valve mounted upstream of the plenum 13. Instead, the FIG. 2 regulator has a spring 21 mounted between the piston's distal face 16 and a base 22, which is adjustable. The spring 21 pushes upward on the piston and makes the piston 2 act like a lighter piston. Normally, the spring 21 is under compression; however, the spring base 22 may, in some embodiments, be pulled down far enough that the spring 21 is put under tension, thereby making the piston 2 seem heavier. This arrangement is preferred to an alternative arrangement where the spring is connected to the piston's frontal face 15 and pulls up on the piston 2. In the preferred arrangement shown in FIG. 2, the spring 21, being mounted inside the piston 2 and the piston-mounting structure 65, is protected from the corrosive effects of the fume-laden air coming from the process equipment.

When the system is at equilibrium—i.e., when the partial vacuum is at the desired strength and the flow rate through the regulator is not varying—the force applied by the spring 21 acting against the weight of the piston 2 should be less than the weight of the piston 2 in order to reduce the apparent weight of the piston 2, and thereby reduce the partial vacuum. In this system the forces balance out as follows:

$$P_{REF} \cdot A + F_{SPRING} = P_{13} \cdot A + W$$

where A=Area of frontal face exposed to fluid upstream of the constriction point, which is substantially equal to the area of distal face;

$P_{13}$=Plenum pressure;

$F_{SPRING}$=Force applied by spring 21; and

W=Weight of piston 2.

Thus, $\Delta P = (W - F_{SPRING})/A$ where $\Delta P$=Pressure differential between plenum 13 and reference-pressure chamber 17.

Figure 3:
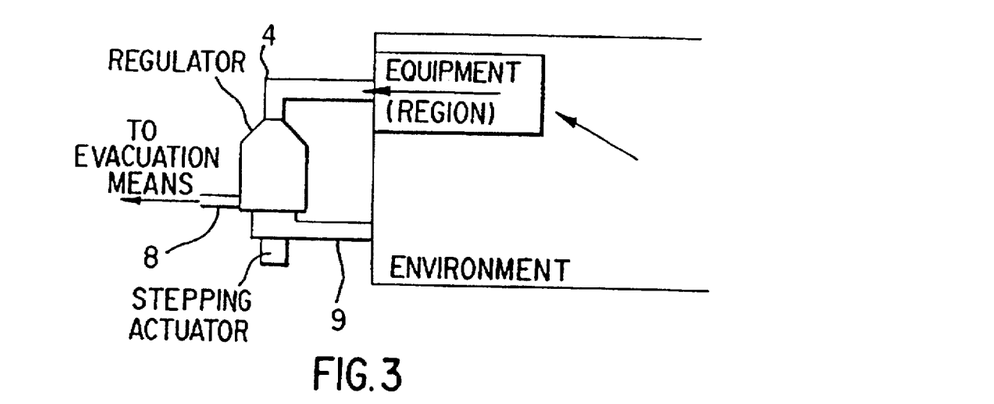
FIG. 3 shows how the device of FIG. 2 may be attached to the process equipment, the environment and the vacuum source.

FIG. 3 shows how the regulator shown in FIG. 2 can be attached to a piece of equipment (or other region) in a process room (or other environment). The regulator's outlet 8 is attached to the vacuum source. Its inlet 4 is attached to the equipment in such a way that there is only a very small pressure drop from the equipment to the plenum 13 of the regulator. The reference port 9 is attached to the environment, so that the reference pressure is the environment's pressure. Thus, air may flow from the environment, through the equipment and the regulator, to the vacuum source. Preferably, the path is not vented to the environment at any point between the inlet 4 and the outlet 8, so that substantially all the fluid that flows through the inlet also flows through the outlet.

The system quickly adapts to changes. If flow into the equipment from the environment is further impeded (such as when a door to the equipment is closed), the pressure in the equipment drops momentarily. The equipment pressure would remain at the lower level if the equipment was attached directly to the vacuum source without the regulator. With the regulator in the flow path between the equipment and the vacuum source, a pressure drop in the equipment tends to cause a pressure drop in the plenum 13, but the piston 2 rises to maintain a constant pressure differential between the plenum 13 and the reference-pressure chamber 17. The piston 2 in the higher position increases the flow impedance between the plenum 13 and the vacuum source, thereby counteracting very quickly the pressure drop in the equipment.

Likewise, the decreasing of the impedance to the flow from the environment into the equipment (such as when a door on the equipment is opened) causes a momentary increase in the pressure in the equipment and causes the piston 2 to move to a lower position. The piston 2 in the lower position decreases the impedance between the plenum 13 and the vacuum source and counteracts any transient pressure increase in the equipment.

Similarly, an increase in the environment's pressure causes the piston 2 to rise to maintain a constant pressure differential between the plenum 13 and the reference-pressure chamber 17. The piston 2 in the higher position increases the impedance on the flow between the equipment and vacuum source, thereby increasing the pressure in the equipment and maintaining a fairly constant partial vacuum in the equipment. Likewise, a drop in the environment's pressure causes the piston 2 to drop to maintain the constant pressure differential between the plenum 13 and the reference chamber 17 and thereby maintain the constant pressure differential between the equipment and the environment— i.e., the constant partial vacuum in the equipment.

The regulator shown in FIGS. 2 and 3 can also maintain a fairly constant partial vacuum in spite of fluctuations in the strength of the vacuum source, which can happen when "cross-talk" between flow regulators occurs—i.e., when the flow rate in other, parallel fluid paths to a common vacuum pump fluctuates. An increase in the vacuum source's strength would cause a decrease in the equipment's pressure if the regulator was not attached between the vacuum source and the equipment. However, in the FIG. 3 system the onset of the increased vacuum source strength causes a minute decrease in the pressure in the plenum 13, which in turn causes the piston 2 to rise, which increases the flow impedance between the plenum 13 and the vacuum source, thereby offsetting the increased strength of the vacuum source. Likewise, a decrease in the vacuum source strength causes the piston 2 to drop, which decreases the regulator's flow impedance, offsetting the decreased strength of the vacuum source.

Thus, the system shown in FIGS. 2 and 3 provides very rapid responses to fluctuations in the equipment's flow impedance, the environment pressure and the vacuum source's strength.

Certain conditions are required for the proper functioning of the regulator. In order to obtain the desired partial vacuum, the vacuum source must be strong enough to create the necessary pressure differential between the regulator's plenum 13 and reference-pressure chamber 17. Also, the impedance between the environment and the equipment cannot be too high or too low. For example, if the equipment is hermetically sealed from the environment, the piston 2 will be pulled up as far as it can go, creating as much flow impedance as it can, perhaps even sealing the plenum 13 off from the vacuum source. In such a situation, air from the reference-pressure chamber 17 could be sucked between the piston 2 and the piston-mounting structure 65, unless there is an effective seal (such as a rolling diaphragm) between the piston 2 and the piston-mounting structure 65. As is discussed in greater detail below, a biasing gas may be introduced into the fluid path between the equipment and the regulator, so that there is always some minimum flow through the regulator.

If there is too little impedance between the environment and the equipment, the piston 2 may be forced down as far as it can go, creating as little impedance as it can. In such a situation, the partial vacuum in the equipment may not be as large as desired.

The force applied by the spring 21 on the piston 2 will typically vary according to Hooke's Law as the spring is extended or compressed from its equilibrium position. In the regulator shown in FIG. 2, the spring 21 is located inside the piston 2 and the piston-mounting structure is typically under compression. When the system is at equilibrium with flow passing through the regulator, the forces acting on the piston 2—the plenum pressure times the frontal face's surface area exposed to fluid upstream of the constriction point, the reference pressure times the distal face's surface area, the piston's weight and the upward force applied by the spring 21—balance out, so that the piston 2 floats without changing position. As the piston 2 rises and falls, in response to changes in the vacuum source strength, the reference pressure or the equipment's flow impedance, the force applied by the spring accordingly decreases or increases according to Hooke's Law (assuming that the spring's base 22 is not moved).

Since the spring force changes based on the position of the piston 2 with respect to the spring base 22, the pressure differential between the plenum 13 and the reference-pressure chamber also changes accordingly: $\Delta P = (W - k \cdot x)/A$, where $k$=spring constant, and $x$=amount spring is compressed.

The varying spring force can be compensated somewhat by altering the effective area of the piston's frontal face 15 so that the ratio of the frontal face's area to the area of the distal face 16 is reduced somewhat. It is preferred to alter the geometry of the constriction point, so that a portion of the top of the piston lies effectively beyond the constriction point and is therefore not directly exposed to the plenum pressure, but rather is exposed to the vacuum downstream of the constriction point.

Figure 6:
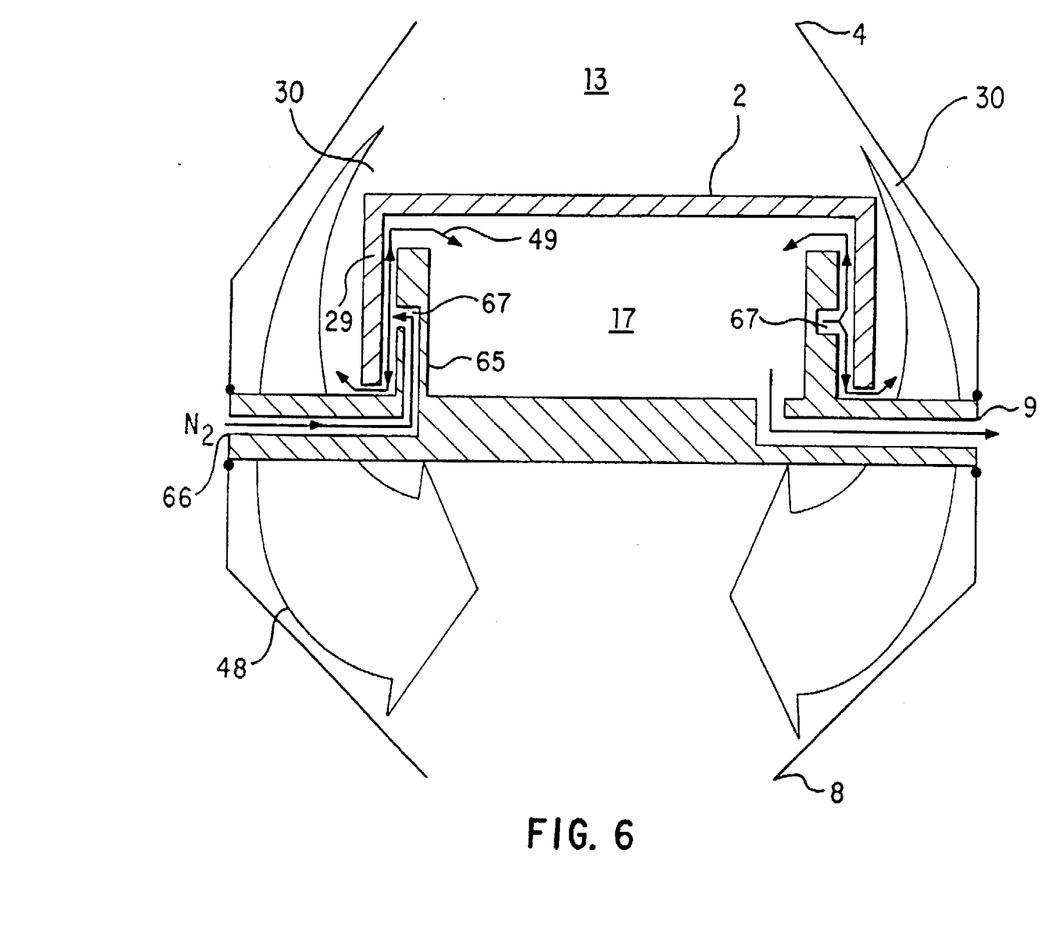
FIG. 6 shows a cross-section of a device which by use of a buffering gas ensures that fume-laden air coming from a fume hood or other equipment cannot leak through the reference-pressure port.
Figure 7:
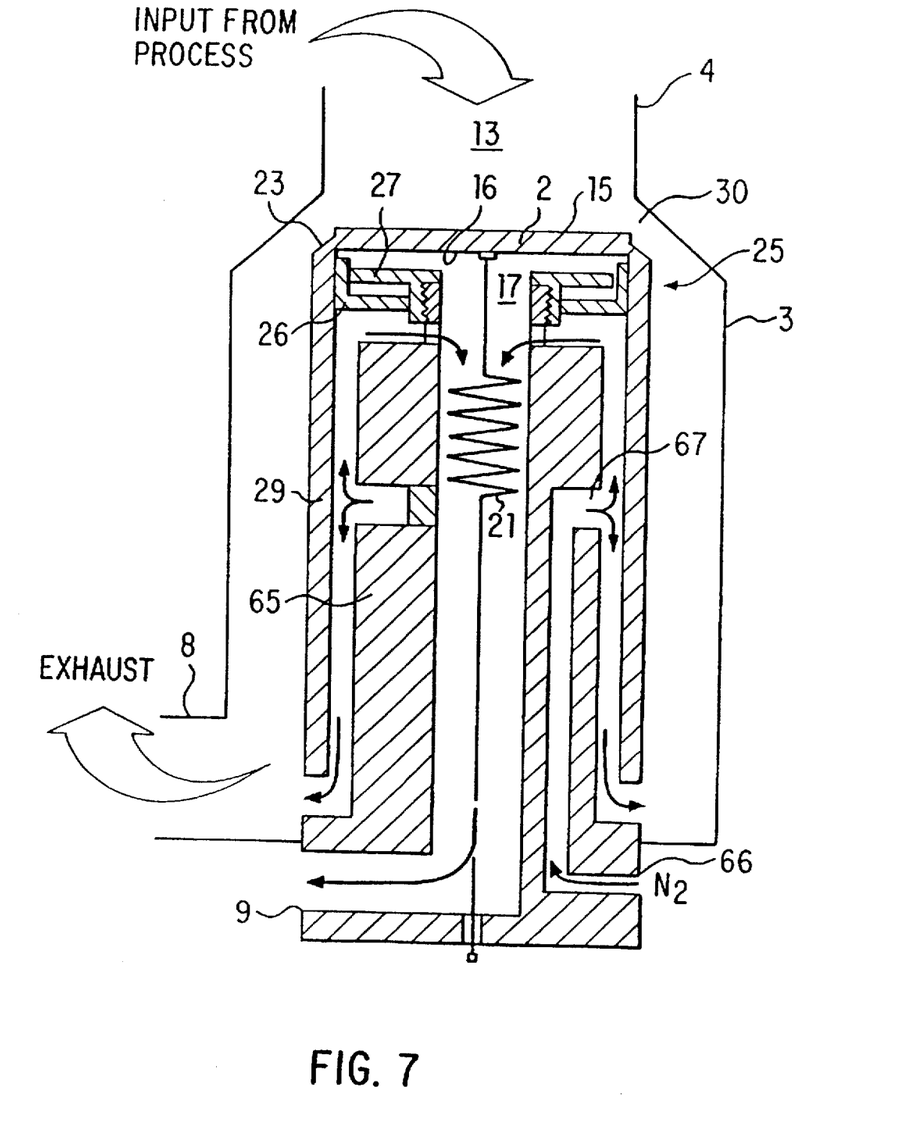
FIG. 7 shows a cross-section of a regulator that uses a buffering gas along with a spring which may be mounted on a base which is adjustable.

As shown in FIG. 7, by altering the rim 23 of the piston 2 in this way the ratio of the areas of the frontal and distal faces (exposed respectively to the plenum 13 and the reference chamber 17) can be made much closer to one. In addition, this geometry balances the pressure exerted by the gas on the bottom of the skirt 29. It is preferred that the gas pressure being exerted upwardly on the bottom of the skirt 29 be balanced by gas pressure downstream of the constriction point on a portion of the top of the piston 2 that is of substantially equal area as the bottom of the piston's skirt 29. Since the plenum pressure is greater than the pressure at the exhaust 8, an altered rim 23 is preferred to an unaltered rim, such as that shown in FIGS. 1, 2 and 6, so as to minimize the effect of changes in the exhaust pressure on the plenum pressure. When a spring 21 is used to reduce the apparent weight of the piston 2, the area of the top of the piston 2 exposed to gas downstream of the constriction point 30 may be increased in order to offset somewhat the changes in force that the spring 21 exerts on the piston when changes in the exhaust pressure cause changes in the piston position. The ratio of the areas may also be varied in order to compensate for the additional downward force applied by the velocity of the air flowing down from the inlet 4.

The stepper motor can also adjust the position of the spring base 22 to compensate for the varying spring force.

The effect of the varying spring force may be further reduced by using a spring with a very small spring constant, $k$, so that changes in the position of the piston, $x$, result in only small changes in the force exerted by the spring. In the preferred embodiment of the invention, a spring made by Century Spring Company of Los Angeles, Calif., part no. H91, which has a k of 0.06 lbs./in. and is ⅞ inches long. These springs work effectively under compression and tension, and are able to apply only a small force in order to offset the low weight of the piston 2. In the preferred embodiment, shown in FIG. 7, the length of travel of the piston from fully open to fully closed is one-hundredth of an inch. Instead of the spring made by Century Spring Co. discussed above, other springs may be used, but in order to offset the low weight of the piston, a very small spring constant is preferred. The spring constant should be large enough, however, so that it can support the weight of the piston without being fully compressed when there is no flow through the regulator. This is desirable so that, when a very small amount of flow through the regulator begins, the weight of the piston can be offset by the spring force. Once the flow begins, the spring base may be pushed up in order to offset the weight of the piston.

Figure 8:
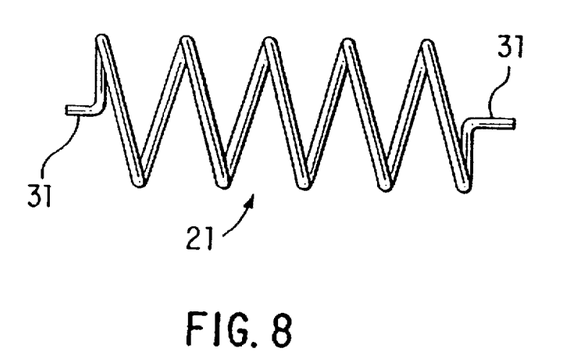
FIG. 8 shows a spring that may be used in the FIG. 7 regulator.
Figure 9A:
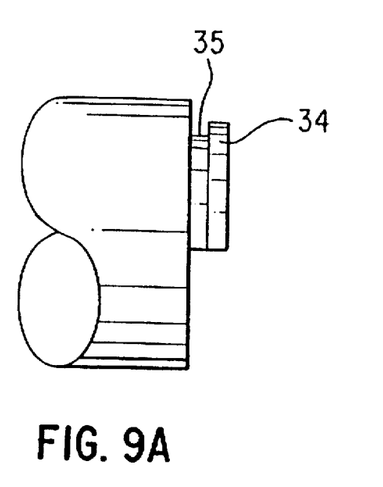
FIGS. 9A and 9B show side and top views of a spring-end connector.
Figure 9B:
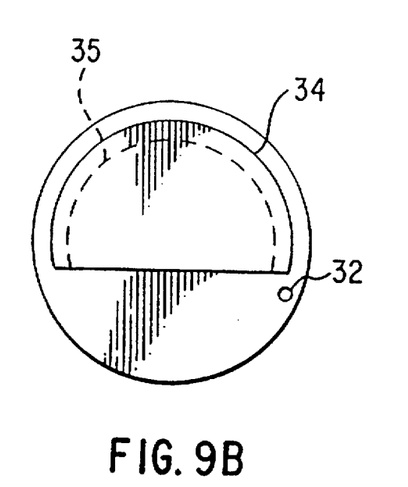
Figure 9C:
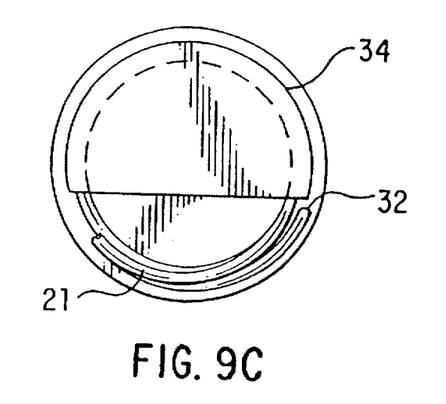
FIG. 9C shows a top view of the connector with a spring attached.

FIG. 8 shows a preferred configuration of the spring 21, having its ends 31 bent so that the ends are oriented axially. FIGS. 9A, 9B and 9C show a preferred connector for attaching the spring to the bottom of the piston 2 and may also be used for attaching the spring to the top of the spring base 22. The use of the spring shown in FIG. 8 and the connector of FIGS. 9A, 9B and 9C permits the spring to be placed under either compression or tension. The connector has a lip 34, which defines a groove 35 that extends more than 180°, and a hole 32, located near one end of the groove 35, for receiving the end 31 of the spring 21. The diameter of the groove matches the inside diameter of the spring 21. FIG. 9C shows the spring 21 attached to the connector. The location of the hole 32 places the spring end 31 just outside of the point where the last coil enters the groove 35, so that the spring end 31 prevents the last coil of the spring 21 from slipping out of the groove 35. This arrangement prevents longitudinal motion of most of the spring's first coil and prevents rotation of the spring. It is also preferred that the stepping motor shaft be keyed to prevent rotation. The advantage of this attachment is that it provides a secure attachment without adding much weight to the piston and without using a chemical adhesive.

Since the system shown in FIG. 3 is meant to create only a small pressure drop from the environment to the plenum 13, it is not usually practical to adopt the FIG. 3 system to maintain a constant flow rate by putting a throttling valve between the equipment to create a large pressure drop between the equipment and the plenum 13, and connecting the reference port 9 to a point upstream of the throttling valve. (Such an arrangement can nevertheless be used, especially if a heavy piston is used and the pressure differential is large.)

Figure 4:
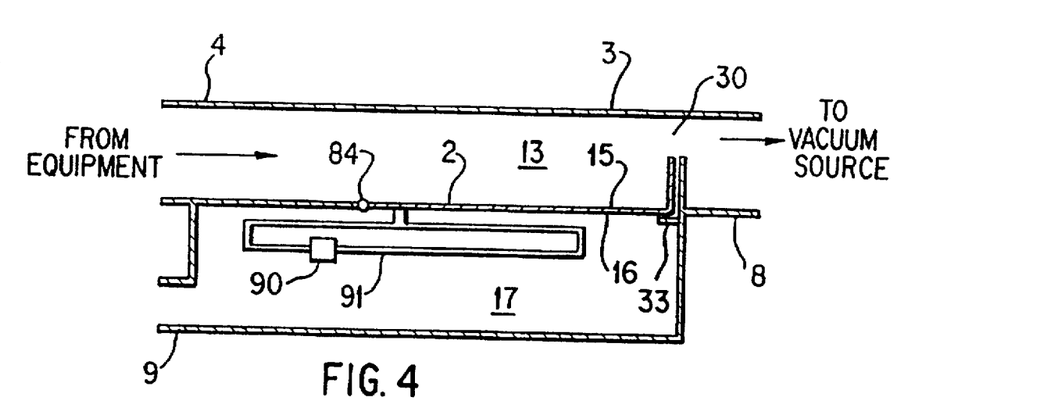
FIG. 4 shows a cross-section of another device that may be used to maintain a partial vacuum and that has a hingedly mounted piston.
Figure 5:
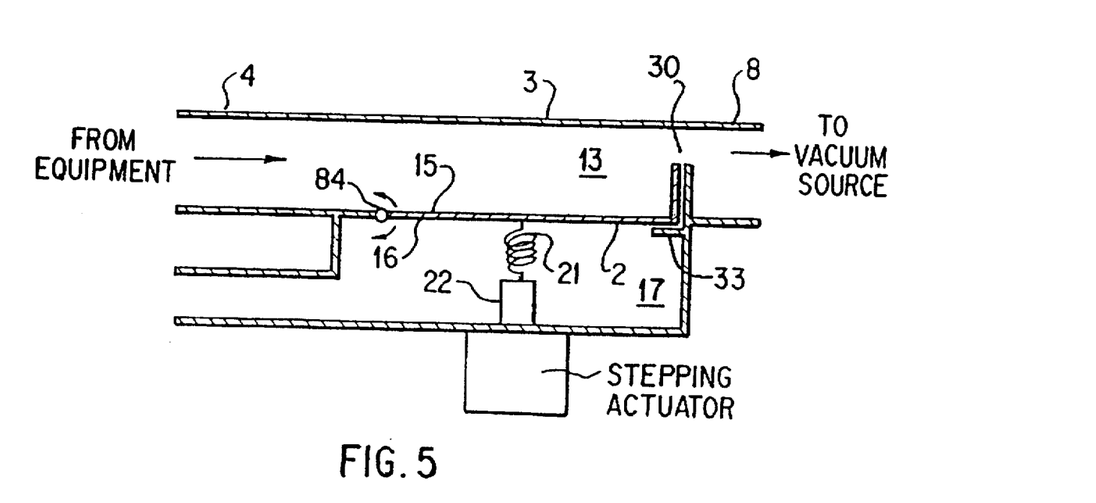
FIG. 5 shows a cross-section of a device similar to the FIG. 2 device, but has a piston that is hingedly mounted.

FIGS. 4 and 5 show regulators that have hingedly mounted pistons 2. These regulators, like the regulators shown in FIGS. 1–3, can be used to regulate the partial vacuum in a piece of process equipment, a fume hood or other region, by attaching their inlets 4 to the equipment, their outlets 8 to a vacuum source, and their reference ports 9 to the process room.

The FIG. 4 regulator's piston 2 has attached to it a slidable weight 90, which can be moved along the weight guide-rod 91 by a stepper motor, like the weight shown in FIG. 9 of U.S. Pat. No. 5,000,221. Moving the weight 90 to the right causes the piston 2 to seem heavier and causes the constriction point 30 to widen (assuming other parameters— reference pressure, vacuum-source strength and the equipment's flow impedance—do not change). Moving the weight 90 to the left causes the piston 2 to seem lighter and causes the constriction point 30 to narrow. By moving the weight 90 far enough to the left of the hinge 84, the apparent weight of the piston can be made very small. The slidable weight 90 provides a torque about pivot point 84 that opposes the torque created by the weight of the piston 2. By making the weight of the piston 2 seem small, a small pressure differential between the plenum 13 and the reference chamber 17 can be maintained, which in turn can be used to maintain a small partial vacuum in the equipment.

For the regulator to operate properly in the orientation shown in FIG. 4, the weight 90 should not be moved so far to the left of the hinge 84 that the piston 2 will rotate up (counterclockwise) when there is no flow through the regulator. In an alternative embodiment, the whole FIG. 4 regulator may be turned 90° counterclockwise. In such an orientation the weight of the piston 2 does not tend to widen the constriction point 30. The weight 90 should be far enough below the hinge 84 that the piston 2 rests against the stop 33 when there is no flow through the regulator. In such an orientation, it is the weight 90 that provides the force to widen the constriction point 30.

The FIG. 5 regulator has a compressed spring 21 that performs like the spring 21 in the FIG. 2 regulator. The spring base 22 can be adjusted up and down as in the FIG. 2 regulator. The spring 21 exerts a force on the bottom of the piston 2 that counteracts the weight of the piston 2. The piston's weight is the restoring force, which tends to widen the constriction point 30. In other words, the restoring torque about the pivot point 84 created by the weight of the piston 2 is opposed by the torque created by compressed spring 21. The spring 21 performs the same function (reducing the apparent weight of the piston) as the slidable weight in the FIG. 4 regulator when the sidable weight is to the left of the pivot point 84.

In addition to springs and weights, other means for applying a torque include the use of a DC electric motor in a stalled condition (which is essentially the use of electromagnetic force) and the use of a piston and cylinder arrangement as may be found in a pneumatic or hydraulic control system. The various means for creating torques can be used to increase or offset the restoring torque.

As in the regulators shown in FIGS. 1 and 2, the frontal and distal faces, 15 and 16, of the regulators shown in FIGS. 4 and 5 are exposed to fluid pressures in the plenum 13 and reference-pressure chamber 17, respectively. When the regulator is operating properly, the pressure in the reference-pressure chamber 17 is greater than the pressure of air flowing through the plenum 7. Therefore, the difference between the pressure forces on the piston's frontal and distal faces results in an additional torque in a counterclockwise direction around the pivot point 84. When the FIG. 5 system is at equilibrium with fluid flowing through the regulator, the torques caused by the spring 21, the plenum/reference-chamber pressure differential, and the weight of the piston 2, balance out, so that the piston floats and provides the necessary impedance to the flow at constriction point 80 to maintain the desired partial vacuum in the equipment.

Although the regulators shown in FIGS. 4 and 5 each have a single constriction point 30, the split-airfoil impeder shown in applications Ser. Nos. 07/850,767 and 07/965,907, or the impeder made of grates shown in application Ser. No. 07/965,907, may be used, thereby providing several constriction points in each regulator.

FIG. 6 shows a variation of the FIG. 1 regulator. Like the FIG. 1 regulator, fume-laden air can flow through the inlet 4 from a region, such as process equipment or a fume hood, which is to be kept at a constant partial vacuum with respect to an environment, which is connected to the reference chamber 17 by means of a reference port 9. The outlet 8 of the regulator is attached to a vacuum source. The flow of the fume-laden air is represented by the wide, white arrows 48.

In this variation, a buffering gas which is harmless to humans, such as nitrogen, is introduced under pressure to the regulator through port 66. The buffering gas passes through the piston-mounting structure 65 to a groove 67 around the perimeter of the piston-mounting structure 65. The buffering gas then moves through the space between the piston-mounting structure 65 and the skirt 29 of the piston 2 in two directions. The path of the buffering gas is shown by the narrow, black arrows 49. Some of the buffering gas passes into the reference-pressure chamber 17, and some of the buffering gas passes into the flow of the fume-laden air and then through the regulator's output 8. This flow of buffering gas into the flow of the fume-laden air prevents any of the fumes from passing through the reference chamber 17 and the reference port 9. According to the safety standards used by several companies, a gas velocity of 300 ft./sec. prevents the backflow of fumes against the flow. Thus, if the velocity of the nitrogen, or other buffering gas, is more than 300 ft./sec., the risk of fumes passing through the reference port into the environment is minimal.

By making the passage between the piston skirt 29 and the piston-mounting structure 65 narrow, and the reference-pressure conduit 9 wide and short, one can minimize the difference in pressure between the reference chamber 17 and the environment. It is important to minimize this pressure difference in order to maintain more effectively a constant partial vacuum in the region with respect to the environment. It is also desirable to place the groove 67 somewhat near the middle of the piston-mounting structure 65, so that the upward drag force on the skirt 29 caused by the buffering gas flowing between the groove 67 and the reference chamber 17 is counteracted by the downward drag force caused by the buffering gas flowing between the groove 67 and the exhaust 8. It is preferred that the groove 67 be slightly above the midpoint of the piston-mounting structure 65, as shown in FIG. 7, so that the downward drag force of the buffering fluid on the inside of the piston skirt 29 balances the upward drag force and the momentum of the upwardly flowing buffering fluid striking the bottom face 16 of the piston 2.

This use of a buffering gas in this way has the additional advantage of keeping the area between the piston skirt 29 and the piston-mounting structure 65 free from particles which can interfere with the movement of the piston. This structure also provides a pressurized-gas (nitrogen) bearing, which permits the regulator to be tilted from its vertical orientation. The non-pressurized air bearings between the piston-mounting structures 65 and the skirt of the piston 2 of the FIG. 1 device do not permit such tilting of the regulator, since the weight of the piston 2 would push the piston skirt against the side of piston-mounting structure 65, thereby creating too much friction for the piston to move easily in response to fluctuations in the pressures of the environment and the region. Linear ball bearings may be used as an alternative to the nitrogen bearing, in order to permit tilting of the regulator. Of course, the linear ball bearings are not, by themselves, effective keeping fumes from leaking through the reference port or particles out of the area between the piston skirt 29 and the piston-mounting structure 65. A flexible diaphragm may be used to seal the reference chamber 17 from the fume-laden air flowing through the regulator.

By tilting the regulator, the weight of the piston 2 provides a smaller restoring force. By reducing the restoring force, the pressure differential between the plenum 13 and the reference chamber 17, and between the region and the environment, is also reduced. Thus, having a direction of movement for the piston which is not vertical can be used to provide a smaller partial vacuum. The regulator should not be tilted as much as 90°, or otherwise the weight of the piston 2 will not provide any restoring force, and if it is tilted more than 90° the weight of the piston will tend to close the constriction point 30.

FIG. 7 shows a regulator that uses a buffering gas, as well as a spring 21 (which is represented schematically) to reduce the apparent weight of piston 2. In this regulator, the piston skirt 29 is significantly longer than the diameter of the piston 2. Since the piston 2 is top-heavy (the piston skirt is thin in order to keep the weight of the piston low), providing a long skirt stabilizes the piston. In addition, forcing the buffering gas to flow a longer distance from the groove 67 to the exhaust 8 decreases the likelihood of the fume-laden air from backing up through the reference-pressure port 9. In addition, the pressure in the reference chamber 17 can be kept very close to pressure of the environment (which is connected to the reference port 9) by keeping (1) the distance the buffering gas has to flow from the groove 67 to the reference chamber 17 long, (2) the passage between the groove and the piston skirt narrow, (3) the distance between the reference chamber 17 and the environment short and (4) the passage between the reference chamber and the environment wide.

Figure 10:
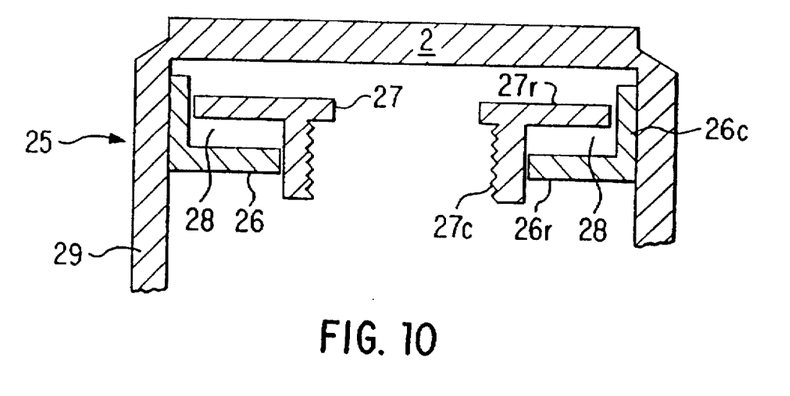
FIG. 10 shows a dashpot for use between a piston and a piston-mounting structure.

The regulator shown in FIG. 7 has a dashpot 25 in order to prevent the piston from oscillating at a harmonic frequency, which a low-weight piston is prone to do. FIG. 10 shows the dashpot 25 in greater detail. The dashpot 25 is made of two rigid portions which can move in relation to each other: the first portion 26 is attached to the piston 2, and the second portion is attached to the piston-mounting structure 65. Each portion is made of a cylindrical wall 26c, 27c and a radial wall 26r, 27r extending perpendicular from the cylindrical wall; for one portion the radial wall 26r is located inside the cylindrical wall 26c, and for the other portion the radial wall 27r is located outside of the cylindrical wall 27c. Both radial walls have circular apertures defined therein. The two dashpot portions 26, 27 together define a chamber 28 of varying volume and are precisely machined so as to fit snugly with respect to each other, but not so tightly as to prevent air from entering or exiting the chamber 28 as the two portions are moved with respect to each other. In the dashpot 25 shown in FIG. 10, the inner diameter of the radial wall 26r of the first portion 26 is only slightly greater than the outer diameter of the cylindrical wall 27c of the second portion 27, and the outer diameter of the radial wall 27r of the second portion 27 is only slightly less than the inner diameter of the cylindrical wall 26c of the first portion 26. Preferably, the dashpot portions 26, 27 are made of titanium, which provides low weight, dimensional stability and corrosion resistance.

When the piston 2 moves (because of some change in the system parameters, such as a change in the strength of the evacuation source) the volume of the dashpot chamber 28 also changes. Because the spaces between the two dashpot portions 26, 27 are so small, air cannot rush into the dashpot chamber 28 too quickly. This arrangement slows and dampens the movement of the piston 2.

Figure 11:
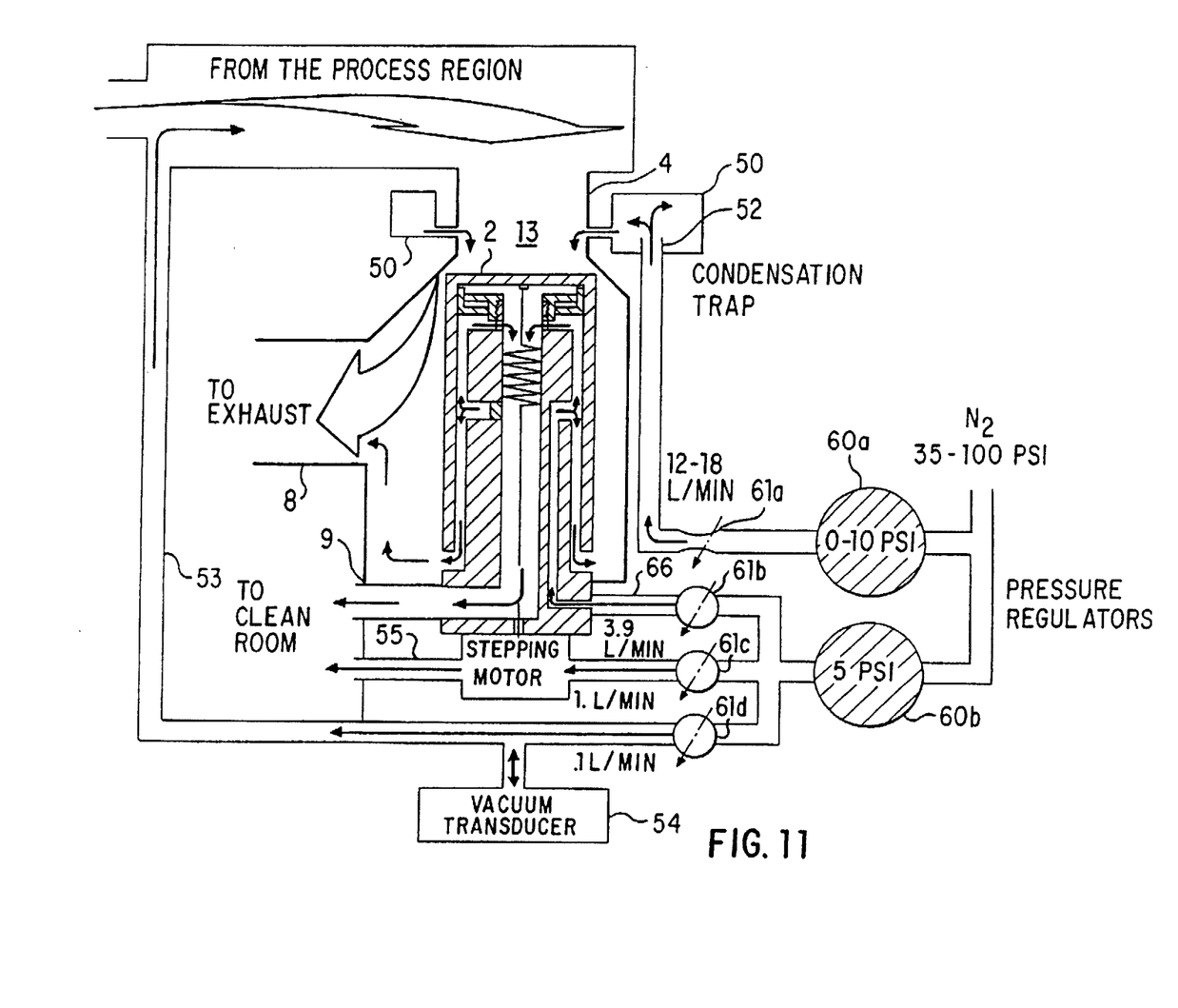
FIG. 11 shows a system for controlling gas flow through a process region (e.g., the area inside a fume hood or a piece of process equipment where process steps take place) to an exhaust.

FIG. 11 shows how the regulator of FIG. 7 may be used in a system for controlling flow through a process region, which may be located inside a piece of process equipment. Air flows from the clean room to the process region, where noxious fumes, such as hydrochloric acid fumes, may be picked up by the air. The process region is kept at a pressure slightly below that of the clean room (the process room) so as to prevent the fume-laden air from flowing back into the clean room. Creating a large pressure differential between the clean room and the region provides the potential for air to flow into the region from the clean room at high velocity. Such high velocity streams can sometimes adversely effect the process taking place inside the region.

In some embodiments, it may be desirable to have the pressure in the process region slightly greater than the pressure in the clean room, in order to keep dust from flowing into the process region from the clean room. The region must still be connected to an evacuation source in order to pull the fumes from the process region into the exhaust system, and the region's pressure usually cannot be too much greater than the clean room's pressure, otherwise noxious fumes may flow out of the region into the clean room. In order to accomplish this, the spring's base is moved up so far that the force of the spring on the piston is greater than the weight of the piston.

As part of the flow-control system, the pressure of the process region is monitored by a pressure (vacuum) transducer 54, which is attached to the process region by a tube 53. The measurements taken by the transducer 54 may be used to determine the proper position of the spring base (item 22 in FIG. 2) so that the desired pressure can be created in the process region. In order to prevent potentially damaging gases (which may be extremely hot or which may contain corrosive fumes) from backing up the tube 53 and damaging the transducer 54, and to prevent water vapor to from entering the tube, condensing and effectively sealing off the transducer from the process region, a buffering gas, such as nitrogen, is provided from valve 61d to the tube 53 under pressure, so as to flow from the transducer 54 to the process region.

Of course, this use of a buffering gas in transducer tube 53 creates a higher pressure at transducer 54 than in the process region. This difference in pressure may be minimized by keeping the velocity of the buffering gas low. (In one embodiment, the tube 53 has a cross-sectional area of 0.08 cm$^2$ and a flow rate of about 0.1 liter/min.) In addition, the readings of the transducer 54 can be adjusted to take into account the higher pressure created by the buffering gas flowing through the tube 53. In any case, although the transducer 53 may not be able to accurately measure the actual pressure in the process region, the transducer 53 can still measure changes in the pressure of the process region.

This buffering gas serves a similar purpose to the buffering gas discussed above in relation to FIG. 6, which shows the buffering gas being introduced to the regulator through port 66. The buffering gas introduced to the regulator through port 66 buffers the clean room (and the spring and the dashpot) from noxious fumes, and the buffering gas fed to the transducer tube 53 buffers the transducer 54 from the potentially corrosive fumes.

The two buffering gases may be provided from the same source, as shown in FIG. 11. A pressurized supply of nitrogen gas ($N_2$) is provided to a conventional regulator 60b which reduces the pressure to about 5 psi. This regulator 60b provides the buffering gas to three variable valves, one of which 61b provides the gas to port 66, another of which 61d provides the gas to the transducer tube 53, and the last of which 61c provides gas for cooling the stepper motor that moves the spring base (item 22 in FIG. 2). By using a regulator 60b and keeping the variable valves 61b, 61c, 61d set at given settings, fairly constant flow rates can be maintained through the valves 61b, 61c, 61d. In the preferred embodiment depicted, the gas that passes through valve 61c (the regulator buffering gas and the stepper-motor cooling gas) eventually ends up in the clean room. Whereas it is particularly important (in the preferred embodiment) that the regulator's reference port 8 be vented to the clean room in order to establish a constant pressure differential between the process region and the clean room, thereby causing the regulator buffering gas to flow into the clean room, it is not important that the cooling gas pass eventually into the clean room, and the cooling gas may be allowed to flow into another area.

Some of the pressurized nitrogen may also be used as a biasing gas. As can be seen in FIG. 11, some of the nitrogen is provided to a second conventional regulator 60a and then to another variable valve 61a, preferably a needle valve. This biasing gas is then supplied through an annular cavity 50 that distributes the gas evenly around the regulator's input 4. The cavity 50 also acts as a condensation trap, removing moisture from any gas that may be backing up the nitrogen supply line (which can happen if the nitrogen supply is cut off). The cavity's input 52 extends into the cavity 50 so as to prevent liquid from flowing back to the needle valve 61a and the regulator 60a if the biasing gas flow were shut off. The tube connecting the needle valve 61a and the cavity 50 is preferably of small diameter to provide resistance to the regulator 60a and to prevent backstreaming of fume-laden gas from the process region to the needle valve 61a and the regulator 60a.

Without the biasing gas flow, the flow rate of gas from the process may vary, for example, from 30 liters/min. to 0.3 l/min.—a variation of 100:1. By introducing, say, 15 l/min. of biasing gas into the input of the regulator, the variation in flow rate that the regulator must handle is only 3:1 (45 l/min. to 15.3 l/min.).

The biasing gas is particularly useful for a preferred embodiment of the regulator, in which the piston 2 and the inside wall of the housing 3 are made of a material, RYTON (made by DuPont), which is hard, dimensionally stable and corrosion resistant, but which does not make a good seal. (In the preferred embodiment of the system the RYTON is placed on the inside of a canister made of PVDF. VYTON is used for the seals in the system.) By using a biasing gas, the piston 2 and the housing 3 do not have to make contact in order to properly control flow. The biasing gas also helps prevent backstreaming into the process region of exhaust materials from other equipment sharing the house-exhaust system.

If there is a possibility of a sudden failure of the house-exhaust system, it is desirable to be able to quickly turn off the biasing gas supply. Otherwise, if there is no exhaust pulling the biasing gas and the fume-laden gas through the regulator, the biasing gas may force the fume-laden gas into the clean room.

Figure 12A:
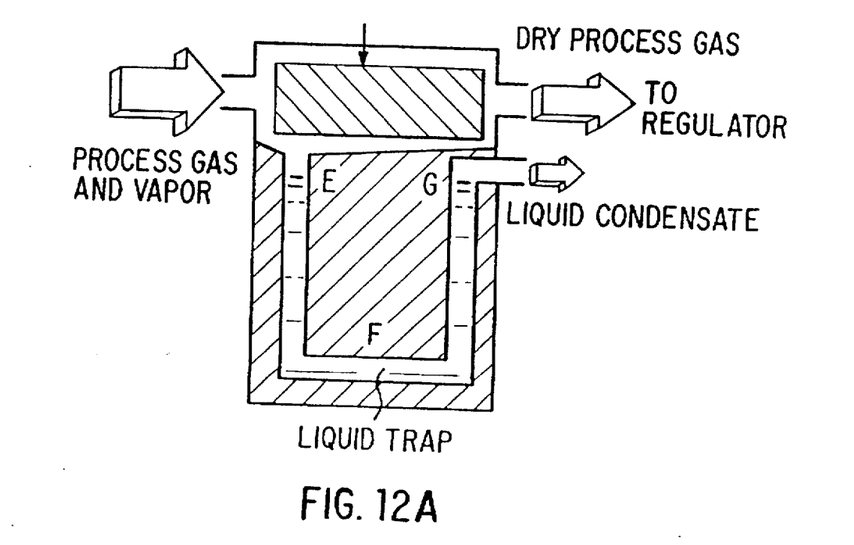
FIG. 12A shows a condensation trap, which may be used in the system shown in FIG. 11.
Figure 12B:
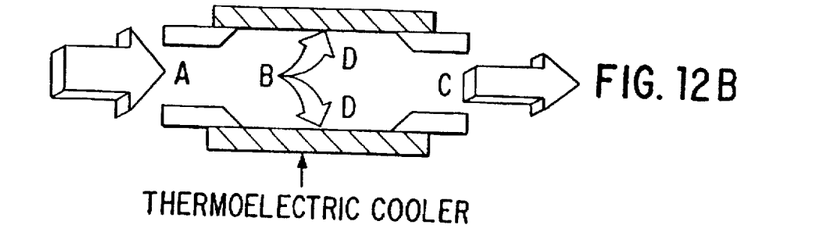
FIG. 12B shows a top view of a thermoelectric cooler, which may be used in the condensation trap shown in FIG. 12A.

Another condensation trap (not shown in FIG. 11) may be located upstream of the regulator's input 4, in order to remove some of the chemicals used in the process before the gases pass through the regulator and into the house exhaust system. FIG. 12A shows a preferred version of such a condensation trap. FIG. 12B shows a top view of the thermoelectric cooler used in the condensation trap. Vapor-saturated gas enters the input of the condensation trap at point A. From point B the gas makes contact with the cold, inner side of a thermoelectric cooler made of peltier elements (solid-state cooling devices, which function like thermocouples in reverse, and which are available from Melcor of Trenton, N.J.) at points D. The condensate is collected on the cold side of the elements.

From point E the condensate can flow into a U-shaped liquid trap, extending to point F and then point G. Preferably the height from point F to point E is sufficient to keep the liquid trap filled with liquid.

What is claimed is:

1. A device for regulating the flow of fluid, the device comprising:

a passageway through which the fluid flows from an inlet to an outlet;

a piston movably mounted so that as the piston moves the piston applies a varying resistance on the flow through the passageway at a constriction point;

a base; and a spring attached to the piston and the base, the spring having at least one of its ends bent so as to be oriented axially, wherein the piston has affixedly mounted thereon a lip such that between the lip and the piston a circular groove is defined, the groove extending more than 180°, a portion of one coil of the spring being located in the groove so that the lip restrains the coil from longitudinal movement, the piston also having defined thereon a hole adjacent one end of the groove, in which the axially oriented end of the spring is inserted.

2. A device as set forth in claim 1, wherein the piston includes a central portion and a rim disposed in the passageway so that the varying resistance applied by the piston at the constriction point is between the rim of the piston and the constriction point.

3. A device as set forth in claim 1, wherein the portion of the spring being located in the groove further restrains the spring from rotational movement.

4. A device for regulating the flow of fluid, the device comprising:

a passageway through which the fluid flows from an inlet to an outlet;

a piston movably mounted so that as the piston moves the piston applies a varying resistance on the flow through the passageway at a constriction point;

a base;

a spring attached to the piston and the base, wherein the piston has affixedly mounted thereon a lip such that between the lip and the piston a circular groove is defined, the groove extending more than 180°, a portion of one coil of the spring being located in the groove so that the lip restrains the coil from longitudinal movement; and means for restraining the spring from rotational movement with respect to the piston.

5. A device as set forth in claim 4, wherein the piston includes a distal face exposed to a reference pressure, and a frontal face exposed to fluid in the passageway.

6. A device as set forth in claim 4, wherein the piston moves in a direction opposite the flow of fluid to apply an increase resistance on the flow through the passageway at the constriction point.

7. A device as set forth in claim 4, wherein the piston moves away from the base to apply an increase resistance on the flow through the passageway at the constriction point.

8. A device for regulating the flow of fluid, the device comprising:

a passageway through which the fluid flows from an inlet to an outlet;

a piston movably mounted in the passageway, so that as the piston moves in a direction opposite the flow of fluid, the piston applies an increase resistance on the flow through the passageway at a constriction point;

a base; and a spring attached to the piston and the base for supporting the piston such that the spring is not fully compressed when there is no flow through the regulator, the spring having at least one of its ends bent so as to be oriented axially; wherein the piston has affixedly mounted thereon a lip such that between the lip and the piston a circular groove is defined, the piston further having defined thereon a hole adjacent one end of the groove, in which the axially oriented end of the spring is inserted.

9. A device as set forth in claim 8, wherein the groove extends more than 180°.

10. A device as set forth in claim 8, wherein a portion of one coil of the spring is located in the groove so that the lip restrains the coil from longitudinal movement.

11. A device as set forth in claim 10, wherein the portion of the spring being located in the groove further restrains the spring from rotational movement.

12. A device for regulating the flow of fluid, the device comprising:

a passageway through which the fluid flows from an inlet to an outlet;

a piston movably mounted in the passageway so that as the piston moves the piston applies a varying resistance on the flow through the passageway at a constriction point, the piston having a distal face exposed to a reference pressure, and a frontal face exposed to fluid in the passageway;

a base; and a spring attached to the piston and the base for supporting the piston such that the spring is not fully compressed when there is no flow through the regulator, the spring having at least one of its ends bent so as to be oriented axially; wherein the piston has affixedly mounted thereon a lip such that between the lip and the piston a circular groove is defined, the piston further having defined thereon a hole adjacent one end of the groove, in which the axially oriented end of the spring is inserted.

13. A device as set forth in claim 12, wherein the groove extends more than 180°.

14. A device as set forth in claim 12, wherein a portion of one coil of the spring is located in the groove so that the lip restrains the coil from longitudinal movement.

15. A device as set forth in claim 14, wherein the portion of the spring being located in the groove further restrains the spring from rotational movement.

16. A device for regulating the flow of fluid, the device comprising:

a passageway through which the fluid flows from an inlet to an outlet;

a base;

a piston movably mounted adjacent the base so that as the piston moves away from the base the piston applies an increase resistance on the flow through the passageway at a constriction point; and a spring attached to the piston and the base for supporting the piston such that the spring is not fully compressed when there is no flow through the regulator, the spring having at least one of its ends bent so as to be oriented axially; wherein the piston has affixedly mounted thereon a lip such that between the lip and the piston a circular groove is defined, the piston further having defined thereon a hole adjacent one end of the groove, in which the axially oriented end of the spring is inserted.

17. A device as set forth in claim 16, wherein the groove extends more than 180°.

18. A device as set forth in claim 16 wherein a portion of one coil of the spring is located in the groove so that the lip restrains the coil from longitudinal movement.

19. A device as set forth in claim 18, wherein the portion of the spring being located in the groove further restrains the spring from rotational movement.

* * * * *